Nov. 19, 1940.  P. J. SHOUGH  2,222,303
COMBINATION FLASHLIGHT OIL GAUGE ROD WIPER
Filed Dec. 12, 1939
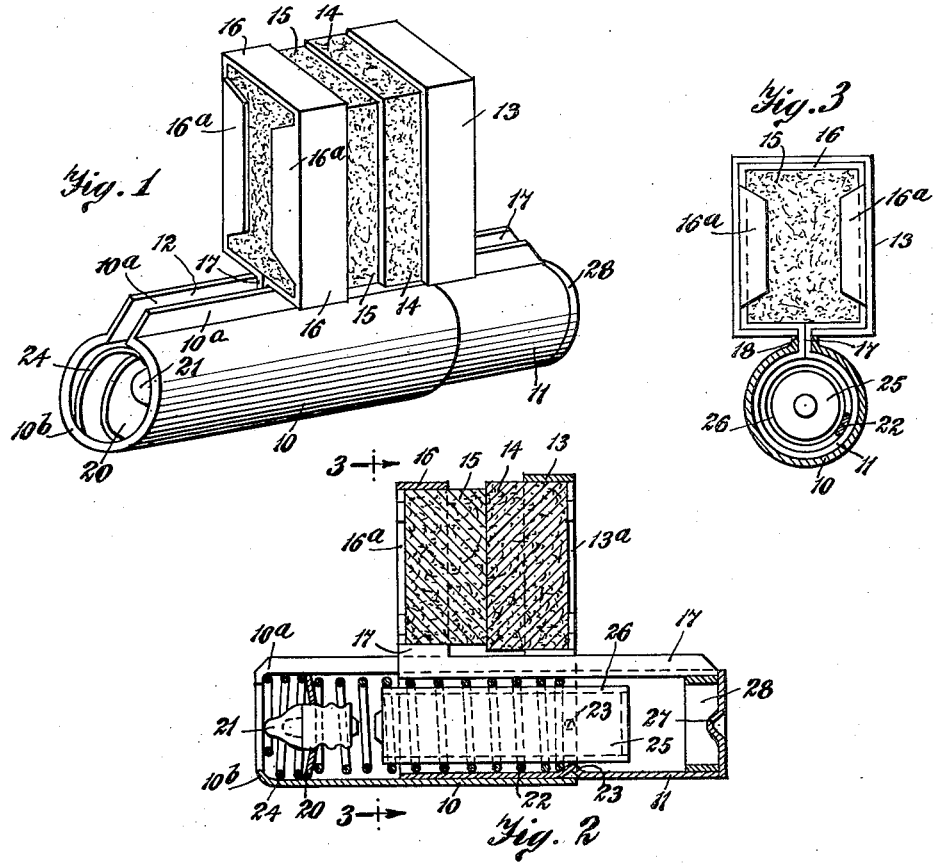
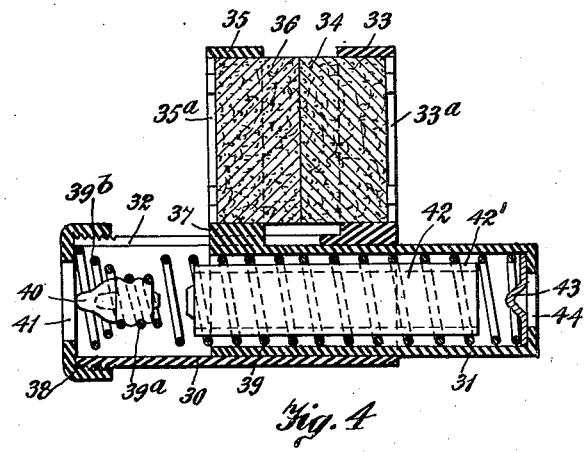
INVENTOR.
PHILIP J. SHOUGH
BY
ATTORNEY.

Patented Nov. 19, 1940

2,222,303

UNITED STATES PATENT OFFICE 2,222,303

COMBINATION FLASHLIGHT OIL GAUGE ROD WIPER

Philip J. Shough, New York, N. Y.

Application December 12, 1939, Serial No. 308,758

9 Claims. (Cl. 240—6.4)

This invention relates to new and useful improvements in an oil gauge rod wiper disclosed in my prior Patent No. 2,134,806, patented on November 1, 1938.

More specifically, the invention contemplates an arrangement whereby the tubular members of the oil gauge rod wiper are utilized in a simple way, in conjunction with a few other simple parts for constructing a flashlight which is particularly intended to illuminate that area of an automobile motor into which the oil gauge rod engages.

To better understand the invention it is pointed out that automobile operators are required at intervals to check the oil in the crank case of their engines by drawing out the oil gauge rod, wiping it off, replacing it in the opening from which it was withdrawn; then drawing it out again and noting the oil level. The gauge must then be replaced by reinserting it in the opening from which it was withdrawn. Frequently this operation is attempted while the automobile is in the garage which often is poorly illuminated or not illuminated at all. Darkness or semi-darkness makes it quite difficult to replace the oil gauge rod in the opening. In accordance with this invention, the small flashlight construction which is now to be incorporated in the tubular members of the oil gauge rod wiper may be conveniently used to illuminate the opening for the gauge rod, making it an easy operation to replace same. Moreover, the oil gauge rod may be conveniently wiped on the wiper as already described in my previous patent.

More specifically, the invention proposes to mount a reflector in the outer end of one of the tubular members and to support an electric light bulb upon the reflector, and to house a battery coaxially within the tubular members and to arrange the parts in a manner so that when the tubular members are pressed together the battery is moved into contacting position to close an electric circuit through the lamp.

Still further the invention proposes to resiliently support the reflector in a manner so that it normally seeks a position in which the bulb is housed within the tubular member, and it is proposed to so arrange the parts that when the tubular members are pressed together to an extreme position the reflector will be forced forwards so that the bulb is projected from the end of the tubular member and may readily be gripped and removed and replaced, as desired.

Another one of the objects of this invention resides in supporting the electric light bulb in a manner so as to eliminate the necessity of an external reflector. This is a possibility in that nowadays electric light bulbs are constructed with internal reflectors so that external reflectors are not necessary.

Another object resides in so arranging the contact element and the circuit that the light may be lit by closing the circuit through a resilient element, or spring housed within the tubular members. With this construction the tubular members may be formed from composition material or other non-electric materials, though if desired electric material such as metals may be used.

Another object of the invention is the construction of a device as described which is simple and durable and which may be manufactured and sold at a low cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a combination flashlight and oil gauge rod wiper constructed in accordance with this invention.

Fig. 2 is a longitudinal vertical sectional view of Fig. 1.

Fig. 3 is a transverse vertical sectional view taken on the line 3—3 of Fig. 2.

Fig. 4 is a longitudinal vertical sectional view of a combination flashlight and oil gauge rod wiper constructed according to a modification of this invention.

The combination flashlight oil gauge rod wiper, in accordance with this invention, includes a pair of tubular members 10 and 11 telescopically connected with each other at one of their ends. The outer tubular member 10 has a slot 12 extending longitudinally along one side. This slot 12 is bounded by the small flange portions 10a bent upwards from the material of the tubular member. A jaw 13 supports a wiper element 14 and is mounted on the inner end of the outer tubular member 10. This jaw 13 and wiper element 14 are opposed to a wiper element 15 mounted on a jaw 16 supported on flanges 17 formed on the inner tubular member 11 and which extend through the slot 12. The jaw 16 is located at the inner end of the inner tubular member 11.

The jaws 13 and 16 are in the form of frames having side walls and end walls. Flanges 13a and 16a, respectively, are formed upon the outer edges of the side walls of the jaws 13 and 16 and serve to engage the outer faces of the wiper elements 14 and 15 to hold them in position. The jaw 16 is slightly smaller than the jaw 13 which is useful during the manufacture and assembly of the rod wiper. This may be understood by considering a simple way of opening the rod wiper. To accomplish this, the jaws 13 and 16 may first be separated by pressing together the tubular member 10 and 11 and then the wiper elements 14 and 15 may be removed. These wiper elements comprise merely blocks of felt material or other absorbent material. The flanges 13a may then be straightened out so as to be in the planes as the side walls of the jaw 13. It is now possible to grip the outer ends of the tubular members 10 and 11 and pull them axially so that the jaw 16 passes through the jaw 13. The parts are now separated.

It should be noted that the jaw 13 is supported upon the top edges of the flanges 10a, or comprises continuations of these flanges. Consequently, there is a space 18 at the bottom of the jaw 13 through which the flanges 17 may pass. This permits the separation as described and the reassembling, when desired.

A reflector 20 is mounted within the outer end of one of the tubular members, for instance, the tubular member 10, as illustrated on the drawing. An electric light bulb 21 is threadedly supported coaxially on the reflector 20. Resilient means is provided for normally urging the tubular members 10 and 11 apart. This resilient means includes a spring 22 mounted within the inner tubular member 11 and having one of its ends engaging against inward projections 23 formed in the side walls of the tubular member 11, and its other end engaging the reflector 20. In view of the fact that the reflector 20 is slidably supported there is an additional spring 24 mounted within the outer tubular member 10. Preferably, the spring 24 should be stronger and stiffer than the spring 22. Consequently when the tubular members 10 and 11 are pressed together the spring 22 first compresses. Then if a certain limit of compression is exceeded, the spring 24 compresses.

A battery 25 is coaxially mounted in the tubular members, and more specifically, is supported within an insulation jacket 26 which in turn slidably engages through the coils of the spring 22. A contact element 27 is arranged on the outer end of the tubular member 11 and is adapted to engage the end of the battery 25. This contact element 27 comprises an inward projection formed upon a cap 28 removably mounted on the end of the tubular member 11.

The operation of the device is as follows:

The cap 28 may be removed and then the battery 25 and casing 26 may be removed from the open end of the tubular member 11. This permits replacement of the battery when it becomes used.

With the parts as illustrated in Fig. 2 the oil gauge rod wiper may be used by pressing together the tubular members 10 and 11 a small amount so that the wiper elements 14 and 15 separate a small distance. The oil gauge rod may be slipped in between the wiper elements and then the tubular members 10 and 11 released so that the wiper elements are forced together indirectly by the action of the spring 22. The wiper rod is then pulled from between the wiper elements 14 and 15 which wipes off the oil thereon.

The opening in the motor body into which the oil gauge rod engages may be illuminated by directing the lamp 21 in the general direction thereof and then pressing together the tubular members 10 and 11 a distance sufficient to cause the contact element 27 to engage the end of the battery 25 and to force the battery forwards so that its end contact engages the end contact of the lamp 21. A circuit is now completed through the lamp 21 and the tubular members 10 and 11. The lamp will now be illuminated. When the tubular members 10 and 11 are released the spring separates them and returns the parts into the positions illustrated in Fig. 2.

It should be noted that the lamp 21 is housed within the open end of the tubular member 10. If it is desired to remove the lamp it is merely necesary that the tubular members 10 and 11 be pressed together with extra force so as to cause the compression of the spring 24 in addition to the compression of the spring 22. The reflector 20 will be forced forwards to a position in which the bulb 21 is projected from the open end of the tubular member 10. It may now be readily gripped and removed and replaced, as desired.

In the modified form of the invention illustrated in Fig. 4 the combination flashlight oil gauge rod wiper includes a pair of tubular members 30 and 31 telescopically connected with each other at one of their ends, and the outer of said tubular members, namely the member 30, is formed with a slot 32 extending longitudinally along one side. A jaw 33 supporting a wiper element 34 is mounted on the inner end of the outer tubular member 30 and is opposed to a jaw 35 supporting a wiper element 36, and the jaw 35 is mounted by a flange 37 extending through the slot 32 on the inner end of the inner tubular member 31. Preferably, the tubular members and the jaws are formed from composition material such as "Bakelite," though if desired they may be of metal. Each jaw and its tubular member preferably is of one piece.

The outer tubular member 30 is provided with a cap 38 threadedly engaged on its outer end. This cap may be removed and then the telescopically engaged tubular members may be taken apart, in that the flange 37 may come out of the open end of the slot 32. The slot 32 extends to the free edge of the tubular member 30. The outer sides of the jaws 33 and 35 are formed with inwardly directed flanges 33a and 35a respectively, for holding the outer faces of the wiper elements 34 and 36. In this form of the invention the jaws 33 and 35 are of identical size.

A spring 39 is mounted within the tubular members and acts to normally urge them apart. This spring has several of its coils 39a near the outer end constricted or formed of a relatively small diameter. An electric light bulb 40 is connected with the spring 39 by being screwed into the small turns 39a thereof. This electric bulb 40 preferably is the type having an internal reflector. The cap 38 has a central opening 41 through which the bulb 40 is visible. However, the bulb 40 normally is located within the tubular member 30.

A battery 42 is coaxially mounted in the tubular members and is of a size so as to normally be out of contact with the end contact of the bulb 40. A contact element 43 of metal is disposed within the outer end of the tubular member 31. The spring 39 rests against this contact element 43 which is in the form of a disc having a central projecting part adapted to engage the rear end of the battery 42. The battery 42 is insulated from the spring 39 by being disposed within an insulation jacket 42'. The outer end of the tubular member 31 is formed with an opening 44 through which the contact 43 may be manually moved if desired.

The turns 39b of the spring adjacent the cap 38 abut the cap. These turns preferably are tempered so that when the tubular members 30 and 31 are pressed together the other turns of the spring first compress.

The operation of the device is as follows:

The tubular members 30 and 31 may be pressed together to open the jaws of the wiper and to engage the contact element 43 against the bottom of the battery 42, forcing the battery 42 forward so that its central contact engages the central contact of the lamp 40. The lamp now lights in that there is a circuit from the battery through the contact 43, the spring 39 and the bulb 40.

If it is desired to unscrew the bulb 40 the tubular members 30 and 31 may be pressed together with greater pressure so that the turns 39b of the spring are pressed together and the bulb 40 projects through the opening 41 of the cap. It may now be gripped and unscrewed.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, resilient means urging said tubular members apart, a reflector in the outer end of one of said tubular members and supporting an electric light bulb, a battery axially in said tubular members, and a contact element on the outer end of said other tubular member engageable with the rear end of said battery when said tubular members are pressed together for moving the battery forwards so that its front end contacts the end contact of said lamp.

2. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, resilient means urging said tubular members apart, a reflector in the outer end of one of said tubular members and supporting an electric light bulb, a battery axially in said tubular members, and a contact element on the outer end of said other tubular member engageable with the rear end of said battery when said tubular members are pressed together for moving the battery forwards so that its front end contacts the end contact of said lamp, said contact element comprising an inward projection formed upon a cap removably mounted upon the end of the tubular member.

3. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, resilient means urging said tubular members apart, a reflector in the outer end of one of said tubular members and supporting an electric light bulb, a battery axially in said tubular members, and a contact element on the outer end of said other tubular member engageable with the rear end of said battery when said tubular members are pressed together for moving the battery forwards so that its front end contacts the end contact of said lamp, said contact element comprising an inward projection formed upon a cap removably mounted upon the end of the tubular member, said cap being arranged to expose the battery when removed.

4. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, resilient means urging said tubular members apart, a reflector in the outer end of one of said tubular members and supporting an electric light bulb, a battery axially in said tubular members, a contact element on the outer end of said other tubular member engageable with the rear end of said battery when said tubular members are pressed together for moving the battery forwards so that its front end contacts the end contact of said lamp, said reflector being set slightly inwards from the end of said tubular member so that the lamp is within the tubular member, and engaging against said resilient means, and resilient means for urging said reflector inwards.

5. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, resilient means urging said tubular members apart, a reflector in the outer end of one of said tubular members and supporting an electric light bulb, a battery axially in said tubular members, a contact element on the outer end of said other tubular member engageable with the rear end of said battery when said tubular members are pressed together for moving the battery forwards so that its front end contacts the end contact of said lamp, said reflector being set slightly inwards from the end of said tubular member so that the lamp is within the tubular member, and engaging against said resilient means, and resilient means for urging said reflector inwards, comprising a spring within the tubular member and acting between an inturned flange on the tubular member and the reflector.

6. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, resilient means urging said tubular members apart, a reflector in the outer end of one of said tubular members and supporting an electric light bulb, a battery axially in said tubular members, a contact element on the outer end of said other tubular member engageable with the rear end of said battery when said tubular members are pressed together for moving the battery forwards so that its front end contacts the end contact of said lamp, said reflector being set slightly inwards from the end of said tubular member so that the lamp is within the tubular member, and engaging against said resilient means, and resilient means for urging said reflector inwards, comprising a spring within the tubular member and acting between an inturned flange on the tubular member and the reflector, said resilient means for urging said tubular members apart comprising a spring acting between the rear of the reflector and holding elements on the remote tubular member, and said latter-mentioned spring being weaker than said aforementioned spring.

7. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, a spring within said tubular members urging them apart, an electric light bulb connected with said spring and viewable through one end of one of said tubular members, a battery coaxially mounted in said tubular members, a contact element within one of said tubular members engageable with the rear end of said battery when the tubular members are pressed together for moving the battery forward so that its front end contacts the end contact of said lamp, and a circuit including said battery and contact for lighting said lamp when said contact engages and moves said battery forwards against the lamp.

8. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, a spring within said tubular members urging them apart, an electric light bulb connected with said spring and viewable through one end of one of said tubular members, a battery coaxially mounted in said tubular members, a contact element within one of said tubular members engageable with the rear end of said battery when the tubular members are pressed together for moving the battery forward so that its front end contacts the end contact of said lamp, and a circuit including said battery and contact for lighting said lamp when said contact engages and moves said battery forwards against the lamp, said spring having certain of its turns reduced and said electric light bulb being mounted in said reduced turns, and the turns of the spring above said electric light bulb being tempered so that they compress last when the tubular members are moved to compress the spring.

9. In a device of the class described, a pair of tubular members telescopically connected with each other at one of their ends and the outer of said tubular members having a slot extending longitudinally along one side, a jaw supporting a wiper element and mounted on the inner end of the outer tubular member and opposed to a jaw supporting a wiper element and mounted with a flange extending through said slot on the inner end of the inner tubular member, a spring within said tubular members urging them apart, an electric light bulb connected with said spring and viewable through one end of one of said tubular members, a battery coaxially mounted in said tubular members, a contact element within one of said tubular members engageable with the rear end of said battery when the tubular members are pressed together for moving the battery forward so that its front end contacts the end contact of said lamp, a circuit including said battery and contact for lighting said lamp when said contact engages and moves said battery forwards against the lamp, said slot extending to the end of said outer tubular member, and a cap removably mounted on the end of the tubular member so that when removed the tubular members may be separated.

PHILIP J. SHOUGH.